United States Patent [19]

Bordas

[11] 4,348,116
[45] Sep. 7, 1982

[54] HOMOGENIZING APPARATUS
[75] Inventor: André Bordas, Fontenay aux Roses, France
[73] Assignees: Fives-Cail Babcock, Paris; Pierre Guerin S.A., Mauze-sur-le-Mignon, both of France
[21] Appl. No.: 202,078
[22] Filed: Oct. 30, 1980
[30] Foreign Application Priority Data
Nov. 13, 1979 [FR] France ................................ 79 27900
[51] Int. Cl.³ ............................................... B01F 3/08
[52] U.S. Cl. .................................... 366/340; 366/134; 138/42; 137/625.3; 137/625.32; 137/625.47; 137/876; 251/126
[58] Field of Search ................. 366/3, 10, 14, 15, 134, 366/40, 131, 176, 336, 337, 338, 340, 341, 27, 28; 138/42, 43, 46, 45; 137/625.3, 625.33, 625.38, 625.48, 872, 625.32, 625.47, 876; 251/121, 126, 216

[56] References Cited

U.S. PATENT DOCUMENTS 1,648,773 11/1927 Lundborg ............................. 138/42
1,659,126 2/1928 Van Atta ........................ 137/625.38
2,447,920 8/1948 Terry ................................. 138/43

FOREIGN PATENT DOCUMENTS 671675 12/1929 France .
788038 10/1935 France .
885826 9/1943 France .
163618 5/1921 United Kingdom .
479235 2/1938 United Kingdom ................ 251/126

Primary Examiner—Harvey C. Hornsby
Assistant Examiner—Joseph M. Pitko
Attorney, Agent, or Firm—Kurt Kelman

[57] ABSTRACT

A homogenizing apparatus comprises a casing having an internal cylindrical surface defining a bore having an open end. A portion of the surface is threaded and the casing defines an inlet portion terminating in an annular chamber along the threaded portion substantially centered between the ends thereof. A rotatable closing plug in the open bore end has a cylindrical threaded portion meshing with the threaded portion of the internal cylindrical surface and longitudinally extending grooves along the cylindrical threaded portion of the plug. The threads of the threaded portions and the grooves define homogenizing passages and the annular chamber surrounds the threaded portion of the plug and communicates with the homogenizing passages whereby a liquid or pasty product delivered under pressure into the inlet port is divided into two equal streams flowing from the centered annular chamber through the homogenizing passages in opposite directions. An outlet conduit receives the streams of homogenized product. Rotation of the plug controls the variation of the section of the homogenizing passages.

9 Claims, 5 Drawing Figures

HOMOGENIZING APPARATUS

The present invention relates to an apparatus for homogenizing a liquid or pasty product and may be of use, for example, in the food, cosmetic or pharmaceutical industries.

Known apparatus of this type comprises a casing having an internal cylindrical surface defining a bore having an open end, a portion of the internal cylindrical surface being threaded and the casing defining an inlet port, a rotatable closing plug in the open bore end and threadedly engaging the threaded portion, the plug having longitudinally extending grooves defining homogenizing passages with the threads, and an outlet conduit for the homogenizing product. The product to be homogenized may be introduced into the casing bore through the inlet port by a piston longitudinally displaceable in the bore upstream of the closing plug. It may also be delivered through the inlet port under pressure, in which case the displaceable piston is eliminated. Whatever the product feeding arrangement, conventional homogenizing apparatus requires the operating pressure to be varied in accordance with the product at a constant throughput. Therefore, the dimensions of the homogenizing passages must be varied, which causes a number of problems.

Heretofore, the problem has been solved by disposing the closing plug with tolerance into differently dimensioned bores and to use a specific plug adapted for each specific case. Substituting one closing plug for another requires an assembly operation. While this procedure may be acceptable for the successive treatment of different products, it cannot be used for modifying the operating conditions during the treatment of one specific product. Such a treatment must be interrupted for replacement of the plug, and this has serious disadvantages.

It is the primary object of this invention to overcome this and other disadvantages and to provide a homogenization unit practically assuring equilibrium of the closing plug.

It is another object of the invention to provide an adjustable closing plug whose adjustment in the casing bore permits variations in the cross section of the homogenizing passages upon rotation of the plug operated from the outside of the casing. Such an adjustable balanced closing plug not only makes the conventional replacement of plugs unnecessary but also makes it possible to control the homogenizing passages during operation because of the balance of the plug.

The above and other objects are accomplished according to the present invention with a homogenizing apparatus which comprises a casing having an internal cylindrical surface defining a bore having an open end, a portion of the internal cylindrical surface being threaded and the casing defining an inlet port terminating in an annular chamber substantially centered between the ends of the threaded portion. A rotatable closing plug in the open bore end has a cylindrical threaded portion meshing with the threaded portion of the internal cylindrical surface. The threads of the threaded portions and the grooves define homogenizing passages and the annular chamber surrounds the threaded portion of the plug and communicates with the homogenizing passages whereby a liquid or pasty product delivered under pressure into the inlet port is divided into two equal streams flowing from the centered annular chamber through the homogenizing passages in opposite directions. Rotation of the plug controls the variation of the section of the homogenizing passages. An outlet conduit receives the stream of homogenizied product.

The above and other objects, advantages and features of this invention will become more apparent from the following detailed description of certain now preferred embodiments thereof, taken in conjunction with the accompanying drawing wherein.

Figure 1:
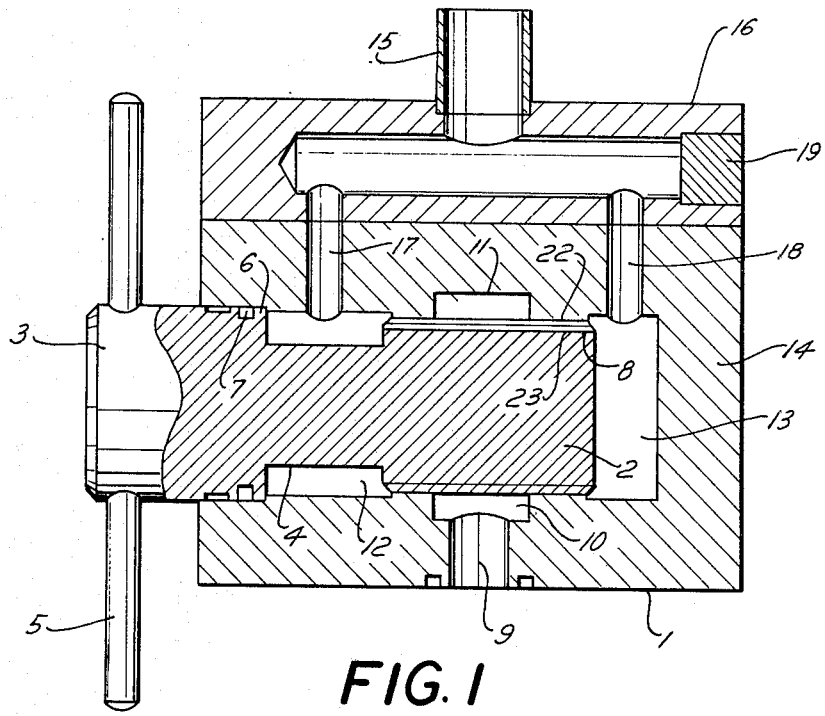
FIG. 1 is an axial section of a homogenizing apparatus according to one embodiment of the invention.

Referring now to the drawing and first to FIG. 1, the illustrated apparatus for homogenizing a liquid or pasty product comprises casing 1 having an internal cylindrical surface defining a bore having an open end. A portion of the internal cylindrical surface is threaded at 22. Casing 1 defines radially extending inlet port 9 terminating in annular chamber 10 along the threaded portion of the internal cylindrical surface substantially centered between the ends of the threaded portion.

Rotatable closing plug 2 in the open bore end has a cylindrical portion threaded at 23 meshing with the threaded portion of the internal cylindrical surface.

In the illustrated embodiments, annular chamber 10 is defined by annular recess 11 in the internal cylindrical surface of casing 1 and the cylindrical threaded portion of plug 2 surrounded by the annular recess.

The illustrated closing plug includes head 3 extending through the open bore end and closing this end. Intermediate portion 4 connects head 3 of the plug to the cylindrical threaded portion thereof and the intermediate plug portion has a cross sectional area smaller than that of head 3 and the cylindrical threaded portion whereby intermediate portion 4 and the internal cylindrical surface of casing 1 surrounding the intermediate plug portion define annular chamber 12 therebetween. Diametrically extending pin 5 is mounted in projecting plug head 3 to provide a handle for rotating the plug. The intermediate plug portion is preferably cylindrical and is coaxial with the head and the threaded portion of the plug to form an integral plug coaxial with the casing bore. The internal cylindrical surface of casing 1 has abutment shoulder 6 in the path of plug head 3, engagement of the plug head with the abutment shoulder delimiting the inward displacement of the plug upon rotation thereof. The contacting cylindrical surfaces of casing 1 and plug head 3 have a diameter larger than that of the threaded casing and plug portions, these contacting surfaces being smooth for gliding engagement therebetween. Annular gasket 7 is mounted between these smooth surfaces to assure fluid tightness between plug head 3 and casing 1.

Plug 2 has longitudinally extending grooves 8 along the cylindrical threaded portion on the periphery of the plug. Threads 22 and 23 of the threaded portions and grooves 8 (see FIGS. 4 and 5) define homogenizing passages and annular chamber 10 surrounds the threaded portion of the plug and communicates with the homogenizing passages whereby a liquid or pasty product delivered under pressure into inlet port 9 is divided into two equal streams flowing from centered annular chamber 10 through the homogenizing passages in opposite directions. The annular chamber 12 communicates with the homogenizing passages to receive one of the streams of homogenized liquid or pasty product therefrom. Annular chamber 12 is axially delimited by shoulders formed by plug head 3 and the threaded portion of plug 2.

Outlet conduit 15 receives the streams of homogenized liquid or pasty product.

In the embodiment of FIG. 1, casing 1 includes bottom wall 14 closing an end of the bore opposite to the open end thereof, and inner end of plug 2 and casing bottom 14 defining chamber 13 therebetween. Chamber 13 communicates with the homogenizing passages to receive the other stream of homogenizied product therefrom. Outlet conduit 15 is disposed laterally adjacent casing 1 and chambers 12 and 13 receiving the stream of homogenized product are in communication with outlet conduit 15.

In the illustrated embodiment, the apparatus further comprises collector 16 of the homogenized product. The collector is attached to casing 1 and the casing and collector define radial channels 17 and 18 respectively connecting chambers 12 and 13 to the collector. Outlet conduit 15 leads from the collector. Thus, the two streams of homogenized product are collected in collector 16 wherefrom the totality of the homogenized products is removed through outlet conduit 15. The collector is shown to be mounted on casing 1 and to have an axially extending collecting chamber open at one end. The open collecting chamber end is closed by plug 19.

Figure 2:
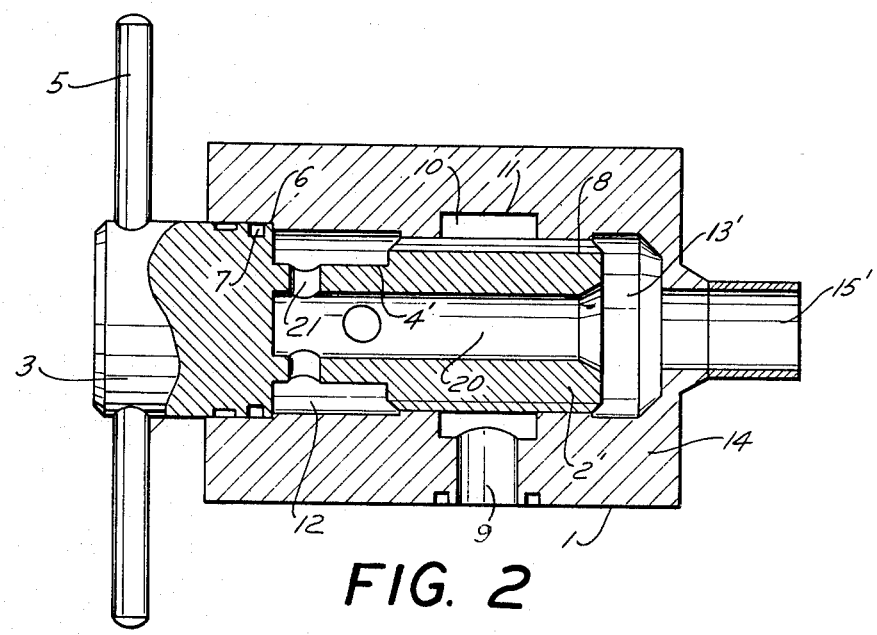
FIG. 2 is a like axial section showing another embodiment of the homogenizing apparatus.

In the embodiment of FIG. 2, like parts functioning in a like manner have been designated by like reference numerals to simplify an understanding and the description of this embodiment, which will be limited to those parts differing from the embodiment of FIG. 1.

In this embodiment, outlet conduit 15' is connected to casing bottom 14 and extends coaxially with plug 2'. The plug defines axial bore 20 extending along intermediate portion 4' and the cylindrical threaded portion of the plug. The axial bore is in communication with outlet conduit 15' through end chamber 13' and the intermediate plug portion defines radial channels 21 connecting annular chamber 12 and axial bore 20. Thus, the one stream of homogenized product flows from chamber 12 through channels 21 into bore 20 while the other homogenized product stream flows into end chamber 13' where the two streams are combined before they are received in outlet conduit 15'.

In the preferred embodiments illustrated herein, casing 1 is of rectangular parallelepiped form. In both embodiments, the pressures in chambers 12 and 13 will be equal and will correspond to the inlet pressure prevailing in annular chamber 10, less the loss of head along the truncated passages of identical lengths traversed by the homogenized product in two opposite paths extending from the center region of plug 2.

The plug is thus practically balanced, which enables it to be rotated even while the apparatus is in operation since no wedging or jamming between the meshing threads of the casing and plug can occur due to significant differences in the pressures exerted upon the opposing end faces of the plug. Simple rotation of pin 5 will impart rotation to plug 2 and to its intermediate portion 4. This may be advantageously used to adjust the plug and vary the section of the homogenizing passages therealong according to a preferred embodiment hereinbelow described.

Figure 3:
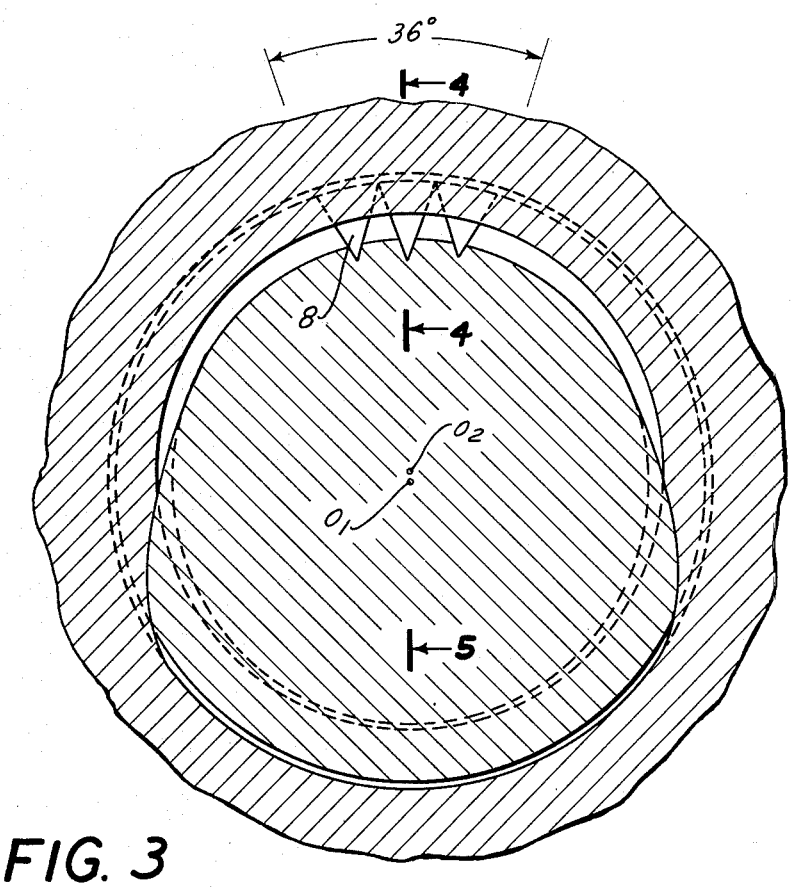
FIG. 3 is a transverse section of the apparatus of FIG. 1 or 2, taken along a plane perpendicular to the axis of the casing and plug outside the range of the annular inlet chamber.
Figure 4:
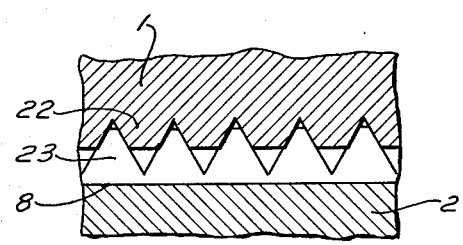
FIG. 4 is a section taken along line 4—4 of FIG. 3.
Figure 5:
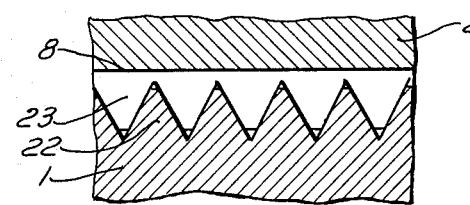
FIG. 5 is a section taken along line 5—5 of FIG. 3 after a 180° rotation of the plug.

This embodiment is illustrated in FIGS. 3, 4 and 5. Longitudinally extending grooves 8 extend over an angular distance not exceeding 90°. In the illustrated embodiment shown by way of example, three grooves 8 are provided, extending over an arc of 36°. As best shown in FIGS. 4 and 5, threads 22 of the internal cylindrical surface of casing 1 are truncated in transverse section in a progressively variable fashion by a second bore of the casing having axis $O_2$ offset from geometric axis $O_1$ of casing 1 whereby the section of the homogenizing passages are controlled by the rotation of plug 2 in relation to casing 1, FIG. 5 showing the plug rotated by 180° in relation to the position shown in FIG. 4. In other words, second bore C defining the crests of threads 22 is eccentric in relation to plug 2.

In FIG. 3, axes $O_1$ and $O_2$ are aligned in a vertically extending plane, axis $O_2$ being positioned above axis $O_1$. Grooves 8 are disposed at either side of the vertically extending plane in a zone where the distance between the axes is at a minimum and where, therefore, threads 22 are most heavily truncated (FIG. 4). Thus, the section of the homogenizing passages is the largest. The opposite condition is shown in FIG. 5 where the distance between the axes is at a maximum. Between these two diametrically opposed positions, any desired intermediate passage section may be attained by rotation of the plug, thus taking into consideration any prevailing operating condition.

The product may be delivered into inlet 9 under pressure by any suitable means, such as a pump.

The apparatus of this invention may be advantageously used as a homogenizing unit replaceably mounted on a cylindrical block with several pistons which compress the product and deliver them to a receptacle whose outlet is connected to inlet conduit 9. In this use, it is preferred to have casing 1 of rectangular parallelepiped form.

It will also be useful to provide head 3 of plug 2 with a scale to indicate the axial position of the plug and its adjustment relative to casing 1.

While the present invention has been described in connection with certain now preferred embodiments thereof, various modifications will readily occur to those skilled in the art without departing from the spirit and scope of this invention as defined by the appended claims which encompass all structural and functional equivalents of the structures set forth therein.

What is claimed is:

1. An apparatus for homogenizing a liquid or pasty product, which comprises
   (a) a casing having an internal cylindrical surface defining a first bore having an open end,
      (1) a portion of the internal cylindrical surface being threaded and
      (2) the casing defining an inlet port terminating in an annular chamber substantially centered between the ends of the threaded portion,
   (b) a rotatable closing plug in the open bore end, the plug having
      (1) a cylindrical threaded portion meshing with the threaded portion of the internal cylindrical surface the threads of the internal cylindrical surface of the casing being truncated in transverse section in a progressively variable fashion by a second bore of the casing having an axis offset from the geometric axis of the first bore, and (2) longitudinally extending grooves along the cylindrical threaded portion of the plug, the threads of the threaded portions and the grooves defining homogenizing passages, and the annular chamber surrounding the threaded portion of the plug and communicating with the homogenizing passages whereby a liquid or pasty product delivered under pressure into the inlet port is divided into two equal streams flowing from the centered annular chamber through the homogenizing passages in opposite directions and the variation of the section of the homogenizing passages is controlled by the rotation of the plug in relation to the casing, and (c) an outlet conduit receiving the streams of homogenized liquid or pasty product.

2. The homogenizing apparatus of claim 1, wherein the annular chamber is defined by an annular recess in the internal cylindrical surface of the casing and the cylindrical threaded portion of the plug surrounded by the annular recess.

3. The homogenizing apparatus of claim 1 or 2, wherein the closing plug includes a head extending through the open bore end and closing said end, and an intermediate portion connecting the head to the cylindrical threaded portion, the intermediate portion having a cross sectional area smaller than that of the head and the cylindrical threaded portion, the intermediate portion and the internal cylindrical surface of the casing surrounding the intermediate portion defining an annular chamber therebetween, said annular chamber communicating with the homogenizing passages to receive one of the streams of homogenized liquid or pasty product therefrom.

4. The homogenizing apparatus of claim 3, wherein the casing includes a bottom closing an end of the bore opposite the open end thereof, an inner end of the plug and the casing bottom defining a chamber therebetween, said chamber communicating with the homogenizing passages to receive the other stream of homogenized liquid or pasty product therefrom, and the outlet conduit is disposed laterally adjacent the casing, the chambers receiving the streams of homogenized liquid or pasty product being in communication with the outlet conduit.

5. The homogenizing apparatus of claim 4, further comprising a collector of the homogenized liquid or pasty product attached to the casing, the casing and collector defining channels respectively connecting the chambers receiving the streams of homogenized liquid or pasty product to the collector and the outlet conduit leading from the collector.

6. The homogenizing apparatus of claim 3, wherein the casing includes a bottom opposite the open end thereof, the outlet conduit is connected to the casing bottom and extends coaxially with the plug, the plug defining an axial bore extending along the intermediate and cylindrical threaded portions thereof, the axial bore being in communication with the outlet conduit, and the intermediate plug portion defining radial channels connecting the annular chamber communicating with the homogenizing passages and the axial bore.

7. The homogenizing apparatus of claim 1 or 2, wherein the casing is of rectangular parallelepiped form.

8. The homogenizing apparatus of claim 1 or 2, wherein the longitudinally extending grooves extend over an angular distance not exceeding 90°.

9. An apparatus for homogenizing a liquid or pasty product, which comprises (a) a casing having an internal cylindrical surface defining a bore having an open end,
  (1) a portion of the internal cylindrical surface being threaded and
  (2) the casing defining an inlet port terminating in an annular chamber substantially centered between the ends of the threaded portion, (b) a rotatable closing plug in the open bore end, the plug having a cylindrical threaded portion meshing with the threaded internal cylindrical surface, one of the threaded portions having longitudinally extending grooves and the other threaded portion being truncated in transverse section in a progressively variable fashion according to a geometric cylinder having an axis offset from the geometric axis of the bore, the threaded portions and the grooves defining homogenizing passages, and the annular chamber surrounding the threaded portion of the plug and communication with the homogenizing passages whereby a liquid or pasty product delivered under pressure into the inlet port is divided into two equal streams flowing from the centered annular chamber through the homogenizing passages in opposite directions, and the variation of section of the homogenizing passages is controlled by the rotation of the plug in relation to the casing, and (c) an outlet conduct receiving the streams of homogenized liquid or pasty product.

* * * * *